(12) United States Patent
Nakayama et al.

(10) Patent No.: US 6,538,457 B2
(45) Date of Patent: Mar. 25, 2003

(54) CAPACITANCE TYPE DISPLACEMENT DETECTION APPARATUS AND METHOD OF MANUFACTURING THE SAME

(75) Inventors: Kenichi Nakayama, Kanagawa (JP); Satoshi Adachi, Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/761,842

(22) Filed: Jan. 18, 2001

(65) Prior Publication Data

US 2001/0009373 A1 Jul. 26, 2001

(30) Foreign Application Priority Data

Jan. 21, 2000 (JP) ........................................ 2000-012610

(51) Int. Cl.[7] .............................................. G01R 27/26
(52) U.S. Cl. ........................ 324/662; 324/658; 324/688
(58) Field of Search ...................... 216/66; 250/231.13; 324/649, 658, 662, 686, 688; 478/118

(56) References Cited

U.S. PATENT DOCUMENTS 5,068,653 A * 11/1991 Klinger et al. ......... 340/870.37
5,394,096 A * 2/1995 Meyer ........................ 324/686
5,841,133 A * 11/1998 Omi ....................... 250/231.13
5,977,781 A * 11/1999 Jordil .......................... 324/658
6,292,001 B1 * 9/2001 Sasaki et al. ................ 324/662
6,294,407 B1 * 9/2001 Jacobs ......................... 438/118
6,296,779 B1 * 10/2001 Clark et al. .................... 216/66

* cited by examiner

*Primary Examiner*—N. Le
*Assistant Examiner*—Walter Benson
(74) *Attorney, Agent, or Firm*—Oliff & Berridge, PLC

(57) ABSTRACT

Both a sensor portion and a signal processing portion are provided on a glass board. The sensor portion is formed by subjecting a conductive layer to the patterning process. A gold coupling layer is provided on the conductive layer and the signal processing portion is formed by the flip chip method on the coupling layer. The sensor portion and the signal processing portion may be formed on the major surface and the rear surface of the glass board and these portions may be coupled by through holes. Since the signal processing portion as well as the sensor portion is formed on the glass board, the wiring distance can be made shorter and the entire size of the sensor can be miniaturized.

17 Claims, 5 Drawing Sheets

DETECTION IC

CAPACITANCE TYPE DISPLACEMENT DETECTION APPARATUS AND METHOD OF MANUFACTURING THE SAME

BACKGROUND OF THE INVENTION

1. Field of the Invention

The present invention relates to a capacitance type displacement detection apparatus and a method of manufacturing the same, in particular, relates to the structure of a detection portion and a signal processing portion thereof.

2. Description of the Related Art

The capacitance type displacement detection apparatus (hereinafter called a capacitance, type sensor) is arranged in a manner that a transmission electrode and a reception electrode are formed on each of two scales provided so as to be able to move relatively to each other. The detection electrode detects that a magnitude of capacitive coupling between the transmission electrode and the reception electrode changes in accordance with the movement of the scale.

FIG. 4 shows the arrangement of the electrode portions of the capacitance type sensor. A transmission electrode 101a and detection electrodes 101b are formed on a scale 101 of two scales, while a reception electrode is formed on the other scale 102. The scale 102 on which the reception electrode is formed moves in the directions shown by arrows in the figure and the displacement of this scale is detected by the scale 101. The transmission electrode 101a is formed by arranging a plurality of electrodes. Every predetermined numbers of the plurality of electrodes are coupled commonly. At least three kinds, preferably, eight or more kinds of alternating signals which phases differ by a predetermined phase angle from one another are supplied to the respective commonly coupled portions. When the scale 102 displaces with respect to the scale 101, the reception electrode generates a composite signal in accordance with the displacement and the detection electrode 101b detects the composite signal. The two detection electrodes 101b are provided so as to sandwich the transmission electrode 101a and output two detection signals which phases differ by 180 degrees to each other. Noise contained in the detection signals can be removed by calculating and using a difference between these detection signals. The detections signals of the two detection electrodes 101b are in a differential relationship, so that an amount and the direction of the displacement of the scale 102 relative to the scale 101 can be detected by processing the detection signals in a signal processing portion. FIG. 5 shows the entire configuration of the capacitance type sensor. The aforesaid scale 101 is provided within a senor portion (detection portion) 110. The sensor portion 110 is formed by the patterning process on a glass or ceramic board. On the other hand, the signal processing portion is configured as a peripheral circuit board 112. The signal processing portion supplies, for example, the eight kinds of alternating signals to the transmission electrode 101a and receives and processes the detection signal from the detection electrodes 101b. The peripheral circuit board 112 includes a detection IC 112a and a peripheral circuit 112b including a capacitor and a resistor etc. on a plastic board made of epoxy resin etc. The sensor portion 110 and the peripheral circuit board 112 (the signal processing portion) are connected through a flexible printed circuit (FPC) 114.

In this manner, in the capacitance type sensor of related art, the sensor portion 110 is configured separately from the peripheral circuit board 112, and the wirings (for example, eight wirings for the transmission side and four wirings for the reception side) are drawn so as to transmit and receive the signals there between. Thus, the longer the drawing distance of the wirings is from the sensor portion to the detection IC 112a, the more likely noise mixes into the detection signal, so that there arises a problem that the detection error arises. In particular, since the signal intensity decreases in accordance with the miniaturization of the sensor portion 110, the influence of the noise on the detection signal becomes larger relatively in accordance with the miniaturization. Accordingly, there arises a problem that the detection accuracy is degraded.

Further, in the related art technique, since the peripheral circuit board 112 serving as the signal processing portion was configured by a resin board made of epoxy resin etc., there arises a problem that it is difficult to further miniaturize the peripheral circuit board due to the restriction of the design rule.

SUMMARY OF THE INVENTION

Accordingly, the invention has been made in view of the aforesaid problems of the related art technique. An object of the invention is to provide a capacitance type displacement detection apparatus and a method of manufacturing thereof which can suppress the mixing of noise by shortening the drawing length of wirings between a detection portion and a signal processing portion and miniaturize the entire size of a sensor.

The object can be achieved by a capacitance type displacement detection apparatus, according to the present invention, comprising:

a detection portion having a transmission electrode and a detection electrode formed thereon which are capacitance-coupled to a reception electrode formed on an opposite scale; and a signal processing portion which supplies a driving signal to the transmission electrode of the detection portion and receives a detection signal from the detection electrode.

In the apparatus, both the detection portion and the signal processing portion are formed on a board made of silica glass, glass, quartz, ceramic or alumina.

It is preferable that the detection portion is formed on one surface of the board and the signal processing portion is formed on the other surface of the board. Incidentally, the board may be made of composite material of silica glass, glass, quartz, ceramic and alumina.

The object can be also achieved by a method of manufacturing a capacitance type displacement detection apparatus, which includes a detection portion having a transmission electrode and a detection electrode formed thereon which are capacitance-coupled to a reception electrode formed on an opposite scale; and a signal processing portion which supplies a driving signal to the transmission electrode of the detection portion and receives a detection signal from the detection electrode. The method comprises the steps of:

sequentially forming a conductive layer and a coupling layer on a board made of silica glass, glass, quartz, ceramic or alumina; and forming the detection portion on the conductive layer and forming the signal processing portion on the coupling layer to thereby form both the detection portion and the signal processing portion on the board.

Further, the object can be achieved by a method of manufacturing a capacitance type displacement detection apparatus, which includes a detection portion having a plurality of transmission electrodes and a plurality of detection electrodes formed thereon which are capacitance-coupled to a reception electrode formed on an opposite scale; and a signal processing portion which supplies a driving signal to the transmission electrodes of the detection portion and receives a detection signal from the detection electrodes. The method comprises the steps of:

forming a conductive layer on each of both surfaces of a board made of silica glass, glass, quartz, ceramic or alumina;

forming a coupling layer on at least one of the both surfaces of the board; and forming the detection portion on one of the both surfaces of the board and forming the signal processing portion on the coupling layer on other of the both surfaces of the board. In this respect, it is preferable that the coupling layer is made of palladium, solder or nickel. Further, it is preferable that at least part of the signal processing portion is formed on the coupling layer by flip chip, BGA (Ball Grid Array) or CSP (Chip Size Package).

According to the invention, unlike the related art technique, the detection portion and the signal processing portion are not formed on the different boards but commonly formed on a board made of silica glass, glass, quartz, ceramic or alumina. Thus, the distance between the detection portion and the signal processing portion can be shortened and the distance required for drawing the wirings can be shortened and so the noise mixing can be effectively suppressed. Further, when the signal processing portion is formed on a substrate made of quartz, glass or ceramic, the design rule can be reduced (more fine processing becomes possible) as compared with a case of forming on a resin-board made of epoxy resin etc., for example, the entire size of the sensor can also be miniaturized.

As modes of forming both the detection portion and the signal processing portion on the same board, there area mode of forming these portions on one surface of the board and another mode of respectively forming these portions on both surfaces of the board. In the mode of respectively forming these portions on both surfaces of the board, since the detection portion is formed on one surface of the board and the signal processing portion is formed on the other surface of the board, the board can be used effectively and also the size of the board itself can be reduced. In the case of forming both the signal processing portion and the detection portion on the same board, it is preferable to employ the flip chip, BGA or CSP since the coupling area can be miniaturized. Further, when the coupling layer is formed on the conductive layer on the board, the contact property can be improved and so the signal processing portion can be formed surely.

DETAILED DESCRIPTION OF THE PREFERRED EMBODIMENTS

The embodiment of the invention will be explained with reference to the drawings.

Figure 1A:
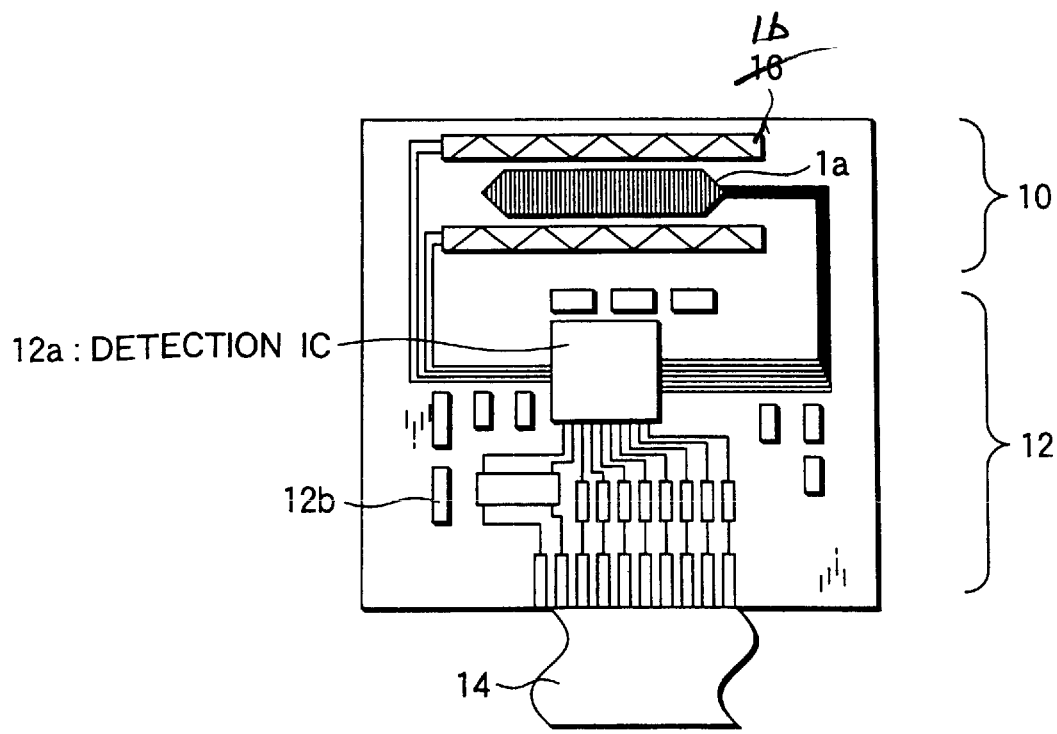
FIGS. 1A and 1B are respectively diagrams showing the configuration of an embodiment of a capacitance type sensor according to the present invention.
Figure 1B:
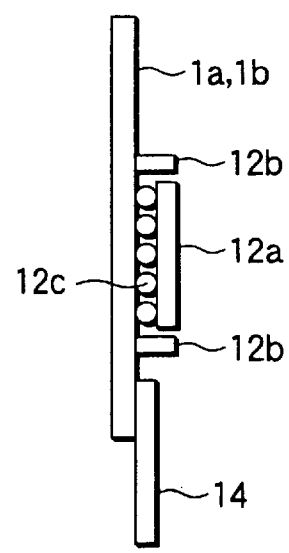

FIGS. 1A and 1B respectively show the configurations of the capacitance type sensor according to the embodiment, wherein FIG. 1A shows a plan view and FIG. 1B shows a side view. In the embodiment, unlike the related art technique, a sensor portion and a signal processing portion are not provided separately but are formed on a glass board commonly. That is, the sensor portion 10 includes a transmission electrode 1a and a detection electrode 1b and is formed on an upper portion of one surface of the glass board. The signal processing portion 12 includes a detection IC 12a and a peripheral circuit 12b which supply, for example, eight kinds of AC signals to the transmission electrode 1a and receive a detection signal from the detection electrode 1b to detect a displacement. The signal processing portion 12 is formed on a lower portion of the same surface of the glass board. Wirings formed by the patterning process on the glass board is provided so as to couple between the sensor portion 10 and the signal processing portion 12, to be more concrete, between the transmission electrode 1a and the detection IC 12a and between the detection electrode 1b and the detection IC 12a. A distance between the sensor portion 10 and the detection Ic 12a is quite short, the long wiring is not needed. Incidentally, as shown in FIG. 1B, the sensor portion 10 is formed on the patterning process on the glass board like the related art technique, and the detection IC 12a of the signal processing portion is coupled on the glass board by means of solder or gold bump 12c using the flip chip method. The forming of the signal processing portion will be described in detail later. The capacitance type sensor according to the embodiment typically connects externally through a flexible printed circuit (FPC) 14.

Figure 2A:
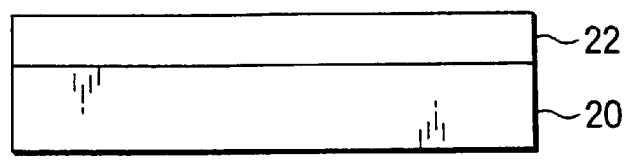
FIGS. 2A–D are respectively diagrams for explaining a manufacturing method of a capacitance type sensor shown in FIGS. 1A and 1B.
Figure 2B:
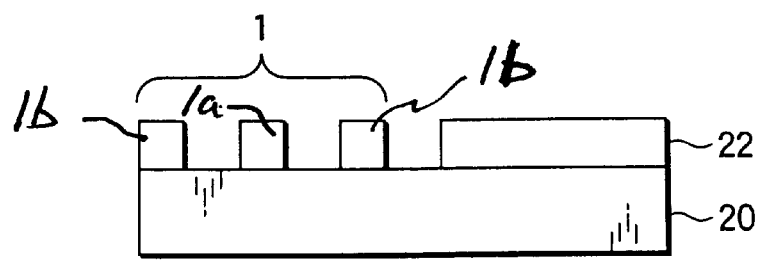
Figure 2C:
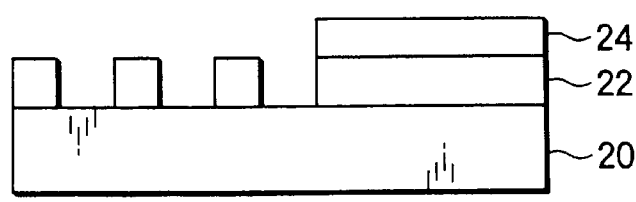
Figure 2D:
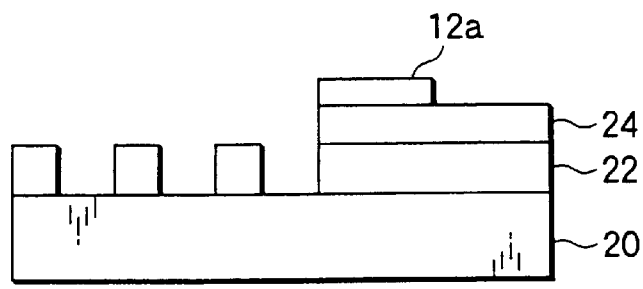

FIGS. 2A–D typically respectively show the manufacturing method of the capacitance type sensor shown in FIGS. 1A and 1B. First, as shown in FIG. 2A, a conductive layer 22 is formed on the glass board 20 by the deposition process, for example. Then, as shown in FIG. 2B, the sensor portion, that is, the transmission electrode la and the detection electrode 1b are formed by using the known patterning method. Next, a gold coupling layer 24 is laminated by the deposition process etc. on an area to which the signal processing portion is to be formed, and then the detection IC 12a is coupled by using the coupling layer 24 by means of the flip chip method. In this respect; the flip chip method is not a method of coupling the IC to the circuit by means of the wire bonding. The flip chip method is a method in which all the terminals of the IC are collected on one surface of the IC and formed in the form of chevron shaped solders or chevron shaped contacts, then the surfaces among the terminals are insulated, then the IC is turned over and the terminals of the IC are attached to just corresponding terminals on the circuit side, respectively. The terminals of the IC and the terminals of the circuit are thermally welded by the soldering or gold etc. It is difficult to directly couple the detection IC 12a on the conductive layer 22. However, it becomes possible to provide the detection IC 12a on the glass board by means of the flip chip method by providing the coupling layer 24 made of gold, palladium, solder, nickel etc. and using this layer as buffer. The peripheral circuit 12b such as a capacitor, a resistor etc. can also be formed on the coupling layer 24.

According to the embodiment, both the sensor portion and the signal processing portion are formed on the same glass board, and the sensor portion and the signal processing portion, in particular, the detection IC are disposed closely to each other, the distance required for the wirings between the sensor portion and the signal processing portion can be shortened and so the noise mixing can be suppressed.

Further, since the wiring resistance can be reduced, an amount of power consumption of the apparatus can be reduced and so the life time of a battery, for example, can he prolonged.

Furthermore, in the embodiment, since the signal processing portion is also formed on the glass board which is excellent in the flatness property and the thermal expansion property and can be shortened in the design rule, it is possible to intend to miniaturize the signal processing portion itself to thereby intend to miniaturize the entire size of the sensor.

Figure 3A:
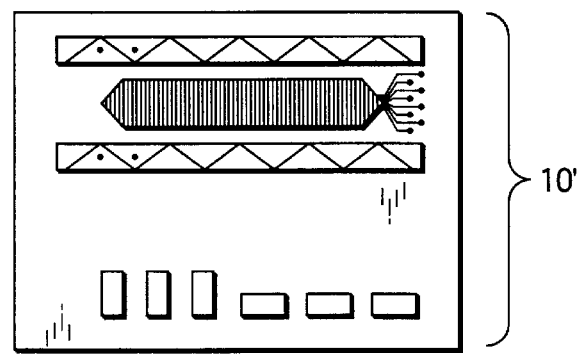
FIGS. 3A–C are respectively diagrams showing the configuration of another embodiment of a capacitance type sensor according to the present invention.
Figure 3B:
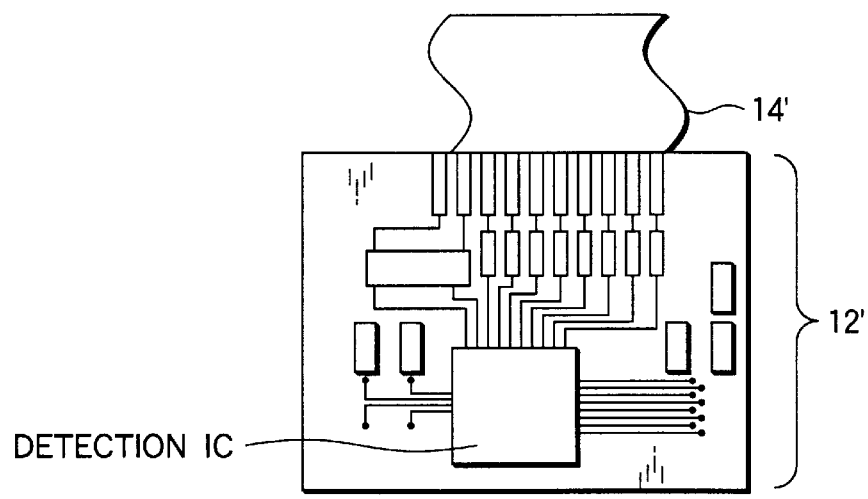
Figure 3C:
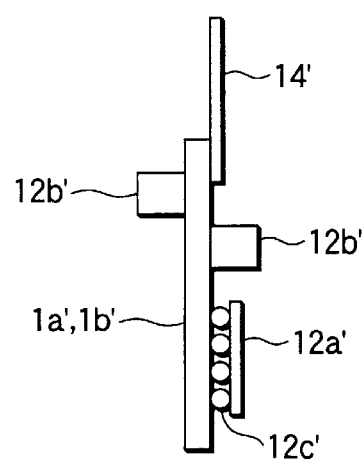
Figure 4:
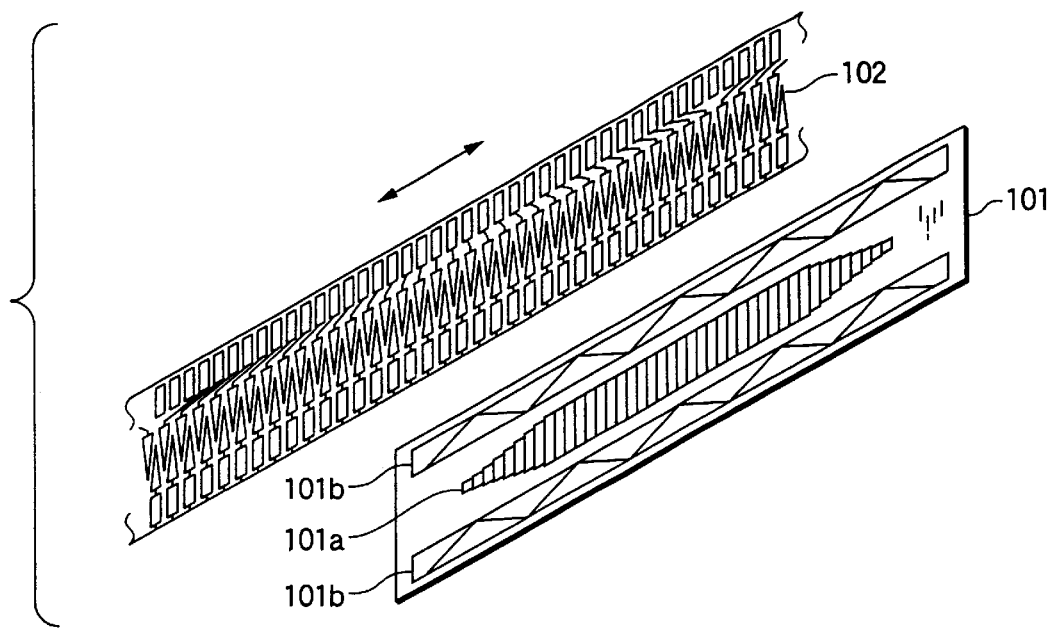
FIG. 4 is a diagram showing the configuration of a sensor portion of a capacitance type sensor.
Figure 5:
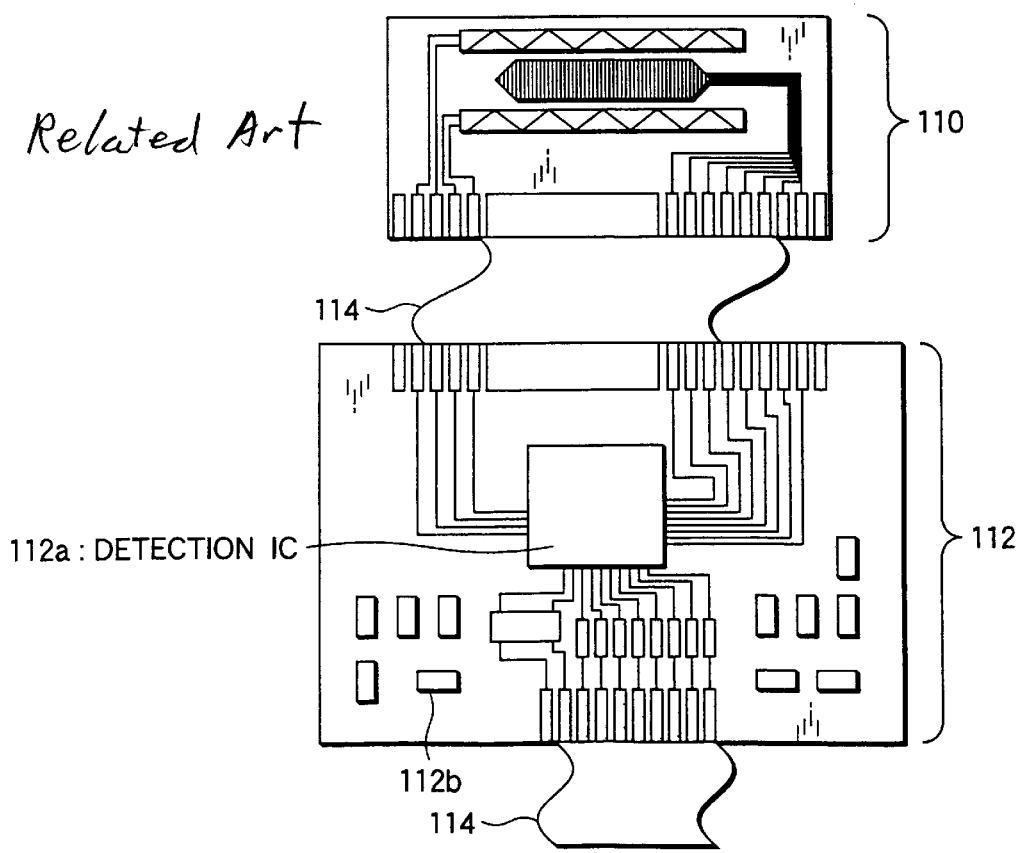
FIG. 5 is a diagram showing the entire configuration of the capacitance type sensor in related art.
Figure 6A:
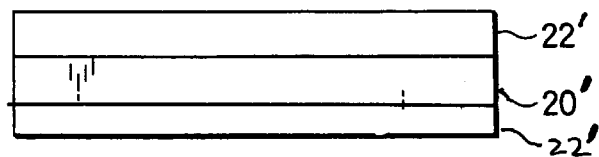
FIGS. 6A–6D are respectively diagrams for explaining a manufacturing method of another embodiment of a capacitance type sensor shown in FIGS. 3A–3C.
Figure 6B:
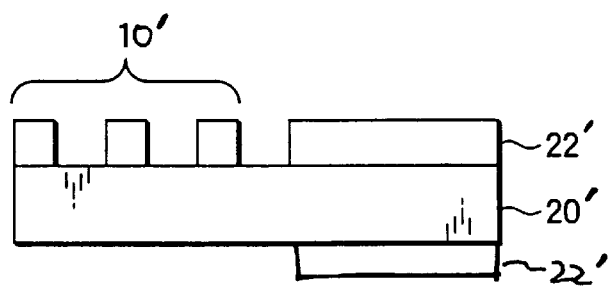
Figure 6C:
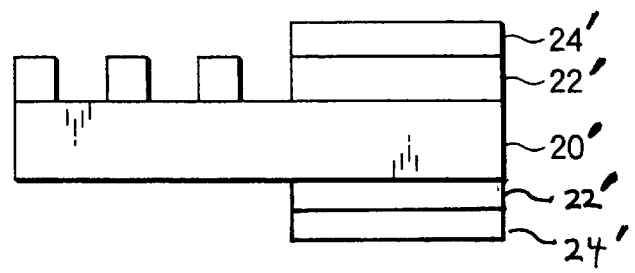
Figure 6D:
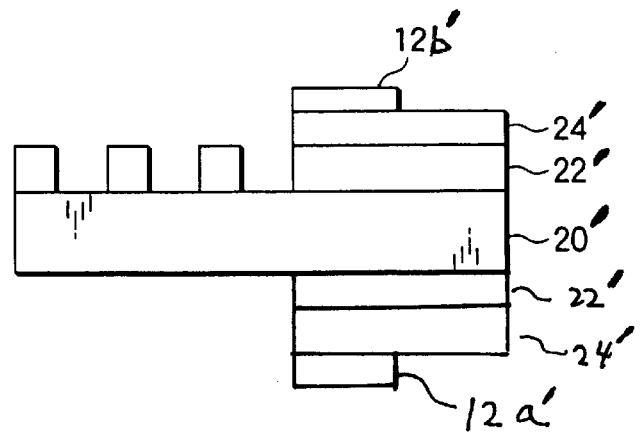

FIGS. 3A–C respectively show the configurations of the capacitance type sensor according to another embodiment, wherein FIG. 3A shows a plan view, FIG. 3B shows a rear view and FIG. 3C shows a side view. Although in the embodiment of, FIGS. 1A and 1B, both the sensor portion and the signal processing portion are formed on one side of the glass board, in this embodiment the sensor portion 10' is formed on one surface (major surface) of the glass board and the signal processing portion 12' is formed on the other surface (rear surface) thereof. As shown in the figure, a flexible print circuit (FPC) 14' is provided so as to connect between the sensor portion 10' and the signal processing portion 12'.

The sensor shown in FIGS. 3A–C is manufactured basically in the same manner as the manufacturing method shown in FIGS. 2A–D. That is, the sensor is manufactured by following steps (a)–(d): As shown in FIGS. 6A–6D, (a) conductive layers 22' are formed respectively on both surfaces of a glass board 20', (b) the conductive layer 22' formed on one surface of the glass board 20' is subjected to the patterning process to form the sensor portion 10', (c) a coupling layer 24' is formed on a portion in each conductive layer 22', where the signal processing portion 12' is to be formed, and (d) the signal processing portion 12' is formed on the coupling layer 24'. In the embodiment, as shown in FIG. 3C, a detection IC 12a' of the signal processing portion 12' is formed on the coupling layer 24' on the other surface of the glass board 20' (that is, on a surface where the sensor portion 10' is not formed), and peripheral circuits 12b' of the signal processing portion 12' are formed on the respective coupling layers 24' formed on the both surfaces of the glass board 20'. Of course, the sensor may be manufactured in a manner that only the conductive layer 22' is formed on the one surface (major surface) of the glass board 20', then the conductive layer 22' is subjected to the patterning process to form the sensor portion 10', then both the conductive layer 22' and the coupling layer 24' are sequentially formed on the other surface (rear surface) of the glass board 20', and the signal processing portion 12' is formed on the coupling layer 24'. Since the sensor portion and the signal processing portion are formed by using the both surfaces of the glass board, the drawing distance of the wirings between the sensor portion and the signal processing portion can be shortened and so the noise mixing can be suppressed, and further the entire size of the sensor can be reduced.

Although in FIGS. 3A–C the wirings between the sensor portion and the signal processing portion is realized by the FPC, it is also preferable to perform the wirings in a manner that through holes are formed at the glass board, and the sensor portion on the major surface and the signal processing portion on the rear surface are connected through the through holes. The through holes may be formed by the laser processing or the die processing. When using the through holes, the wiring distance between the sensor portion and the signal processing portion can be shortened and hence the detection can be made with further high accuracy.

Further, although in this embodiment both the sensor portion and the signal processing portion are formed on the glass board, both the sensor portion and the signal processing portion may be formed on a silica glass board, a ceramic board, a quartz board, an alumina board or a board made of composite material of them.

The characteristics of these material of the board, that is, glass, silica glass (quartz glass), ceramic, alumina will be described below. That is, glass is formed by mainly mixing impurities such as metal etc. in quartz. Although the glass is cheap and hardly broken as compared with the silica glass, the glass is large in its linear expansion coefficient and so there may arise the measurement error due to the temperature. The silica glass is smaller in linear expansion coefficient as compared with usual glass and so the measurement error due to the temperature scarcely occurs. Further, since the silica glass can be used at a high temperature (800 degrees centigrade), the degree of freedom of the process is high. The quarts is formed by crystallizing the silica (silica glass is non-crystallized), so that the quarts is smaller in its linear expansion coefficient and higher in its melting point as compared with the usual glass. Thus, the measurement error due to the temperature scarcely occurs in the quartz. Further, since the quartz is in a crystallized state, it is possible to pile up a device (for example, an IC including an encoder circuit) in a crystallized state thereon. Furthermore, since the quartz can be used at a higher temperature (800 degrees centigrade) as compared with the usual glass, the degree of freedom of the process is high. The alumina (Al2O3) is smaller in linear expansion coefficient and high in its hardness as compared with usual glass, and so hardly broken. Thus, the measurement error due to the temperature scarcely occurs in the alumina. Further, like the quartz, since the alumina is in a crystallized state, it is possible to pile up a device in a crystallized state thereon. Furthermore, since the alumina can be used at a higher temperature (800 degrees centigrade), the degree of freedom of the process is high.

Although in the aforesaid embodiments, the detection IC 12a is connected on the glass board by the flip chip method, the detection IC may be connected by the BGA or the CSP. The BGA (ball grid array) is a method wherein terminals are disposed on a plane (in a grid array shape) and directly mounted on electrodes of a substrate. The CSP (chip size package) is a package obtained by miniaturizing the BCA almost to a chip size. When the pads disposed at the periphery of an IC chip are converted in an aria shape on the lower surface of a board through a terminal arrangement conversion board, the IC can be directly mounted on the board.

As described above, according to the invention, the drawing length of wirings between the detection portion and the signal processing portion can be shortened, so that the noise mixing can be suppressed and the entire size of the sensor can be miniaturized.

What is claimed is:
1. A capacitance type displacement detection apparatus comprising:

a detection portion having a transmission electrode and a detection electrode formed thereon and formed on a board, the transmission electrode and the detection electrode formed on one scale and being capacitance-coupled to a reception electrode formed on the other scale opposite to the one scale; and a signal processing portion formed on the board and for supplying a driving signal to the transmission electrode and receiving a detection signal from the detection electrode, wherein said board is a board made of one of silica glass, glass, quartz, ceramic and alumina.

2. The capacitance type displacement detection apparatus according to claim 1, wherein said detection portion and said signal processing portion are formed on the same surface of said board.

3. The capacitance type displacement detection apparatus according to claim 1, wherein said detection portion is formed on one surface of said board and said signal processing portion is formed on other surface of said board.

4. The capacitance type displacement detection apparatus according to claim 3, wherein said detection portion and said signal processing portion are connected with a flexible print circuit.

5. The capacitance type displacement detection apparatus according to claim 3, wherein said board has a through hole and said detection portion and said signal processing portion are connected through the through hole.

6. The capacitance type displacement detection apparatus according to claim 1, wherein said signal processing portion is connected to said board with a connecting portion.

7. The capacitance type displacement detection apparatus according to claim 6, wherein said connecting portion is a gold bump.

8. A method of manufacturing a capacitance type displacement detection apparatus which comprises a detection portion having a transmission electrode and a detection electrode formed thereon, the transmission electrode and the detection electrode formed one scale and being capacitance-coupled to a reception electrode formed on the other scale opposite to the one scale, and a signal processing portion for supplying a driving signal to the transmission electrode and receiving a detection signal from the detection electrode, said method comprising the steps of:

forming a conductive layer on one surface of a board;

forming the detection portion in the conductive layer;

forming the coupling layer on the conductive layer; and forming the signal processing portion on the coupling layer, wherein said board is a board made of one of silica glass, glass, quartz, ceramic and alumina.

9. The method of manufacturing the capacitance type displacement detection apparatus according to claim 8, wherein said coupling layer is made of one of gold, palladium, solder and nickel.

10. The method of manufacturing the capacitance type displacement detection apparatus according to claim 8, wherein at least part of said signal processing portion is formed on said coupling layer by one of flip chip, BGA and CSP.

11. The method of manufacturing the capacitance type displacement detection apparatus according to claim 8, wherein the detection portion is formed by patterning the conductive layer.

12. The method of manufacturing the capacitance type displacement detection apparatus according to claim 8, wherein the coupling layer is formed in an area where the detection portion is not formed in the conductive layer.

13. A method of manufacturing a capacitance type displacement detection apparatus which comprises a detection portion having a transmission electrode and a detection electrode formed thereon, the transmission electrode and the detection electrode formed one scale and being capacitance-coupled to a reception electrode formed on the other scale opposite to the one scale, and a signal processing portion for supplying a driving signal to the transmission electrode and receiving a detection signal from the detection electrode, said method comprising the steps of:

forming a conductive layer on each of a first surface and a second surface of a board;

forming a coupling layer on at least the first surface of said board;

forming said detection portion in the conductive layer formed on the second surface of said board; and forming said signal processing portion on the coupling layer formed on the first surface of said board, wherein said board is a board made of one of silica glass, glass, quartz, ceramic and alumina.

14. The method of manufacturing the capacitance type displacement detection apparatus according to claim 13, wherein said coupling layer is made of one of gold, palladium, solder and nickel.

15. The method of manufacturing the capacitance type displacement detection apparatus according to claim 13, wherein at least part of said signal processing portion is formed on said coupling layer by one of flip chip, BGA and CSP.

16. The method of manufacturing the capacitance type displacement detection apparatus according to claim 13, wherein the detection portion is formed by patterning the conductive layer.

17. The method of manufacturing the capacitance type displacement detection apparatus according to claim 13, wherein said coupling layer forming step is performed after detection portion forming step.

* * * * *